(12) United States Patent
Dropps et al.

(10) Patent No.: US 9,590,924 B1
(45) Date of Patent: Mar. 7, 2017

(54) NETWORK DEVICE SCHEDULER AND METHODS THEREOF

(71) Applicant: QLOGIC, Corporation, Aliso Viejo, CA (US)

(72) Inventors: Frank R. Dropps, Maple Grove, MN (US); Gary M. Papenfuss, St. Paul, MN (US); Leo J. Slechta, Jr., Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 214 days.

(21) Appl. No.: 14/658,544

(22) Filed: Mar. 16, 2015

Related U.S. Application Data

(62) Division of application No. 13/678,047, filed on Nov. 15, 2012, now Pat. No. 8,995,425.

(51) Int. Cl.
*H04L 12/861* (2013.01)

(52) U.S. Cl.
CPC .................................... *H04L 49/90* (2013.01)

(58) Field of Classification Search
None
See application file for complete search history.

(56) References Cited

U.S. PATENT DOCUMENTS

2012/0069839 A1    3/2012    Kunz et al.

OTHER PUBLICATIONS

"Notice of Allowance from USPTO dated Jan. 5, 2015 for U.S. Appl. No. 13/678,047".

*Primary Examiner* — Kwang B Yao
*Assistant Examiner* — Adam Duda
(74) *Attorney, Agent, or Firm* — Klein, O'Neill & Singh, LLP

(57) ABSTRACT

Methods and systems for a network device are provided. The network device includes a stage one arbiter for a base-port having a plurality of sub-ports for determining if there are any pending requests; blocking any other requests from a same receive queue destined for a same sub-port, same transmit queue when there are any pending requests; selecting a group of requests with a highest priority and available resources; selecting highest priority requests; selecting an oldest one of the highest priority requests; sending the selected requests to a stage two arbiter for selecting a request with a highest priority and when there are requests that have a same priority, selecting an oldest request for processing.

20 Claims, 13 Drawing Sheets

NETWORK DEVICE SCHEDULER AND METHODS THEREOF

CROSS-REFERENCE TO RELATED APPLICATION

This application is a divisional of U.S. application Ser. No. 13/678,047, filed on Nov. 15, 2012, the contents of which are hereby incorporated by reference in its entirety.

BACKGROUND

Technical Field

The embodiments disclosed herein are related to networks and network devices.

Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment a machine-implemented method is provided. The method includes determining if a packet has been received at a receive segment of a base-port of a network device having a plurality of sub-ports configured to operate independently as a port for sending and receiving packets at a plurality of rates complying with a plurality of protocols; storing the packet at a selected pause buffer receive queue; determining if any requests for the selected receive queue are staged at a memory device used for storing a tag for the packet; determining if another request from the selected receive queue is active when no requests for the selected receive queue are staged at the memory device; determining if more than one request is active from the selected request queue when there is another request active for the selected receive queue; staging the request at the memory device when more than one request is active from the selected request queue; and sending the request to a stage one arbiter when more than one request is not active from the selected request queue.

In another embodiment, a machine-implemented method for arbitration in a network device having a base-port with a plurality of sub-ports is provided. The method includes determining by a stage one arbiter if there are any pending requests from the plurality of sub-ports that are configured to operate independently as a port for sending and receiving packets at a plurality of rates complying with a plurality of protocols; blocking any other requests from a same receive queue destined for a same sub-port, same physical transmit queue, and same virtual transmit queue when there are any pending requests; selecting a group of requests with a highest priority and available resources; selecting at least two of the highest priority requests; selecting an oldest one of the requests having the same priority when there are requests with a same priority; and sending the selected requests to a stage two arbiter for the base-port.

In yet another embodiment, a network device is provided. The network device includes a stage one arbiter for a base-port for determining if there are any pending requests, where the base-port includes a plurality of sub-ports configured to operate independently as a port for sending and receiving packets at a plurality of rates complying with a plurality of protocols; blocking any other requests from a same receive queue destined for a same sub-port, same physical transmit queue, and same virtual transmit queue when there are any pending requests; selecting a group of requests with a highest priority and available resources; selecting at least two of the highest priority requests; selecting an oldest one of the requests having the same priority when there are requests with a same priority; sending the selected requests to a stage two arbiter for the base-port; and determining if any new requests have been made or if any previously pending requests have been removed. The network device also includes a stage two arbiter for determining if there are any pending requests, and if there are pending requests, selecting a request with a highest priority and when there are requests that have a same priority, selecting an oldest request from among the requests with the same priority.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and non-obvious systems and methods for using memory devices in switch elements shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
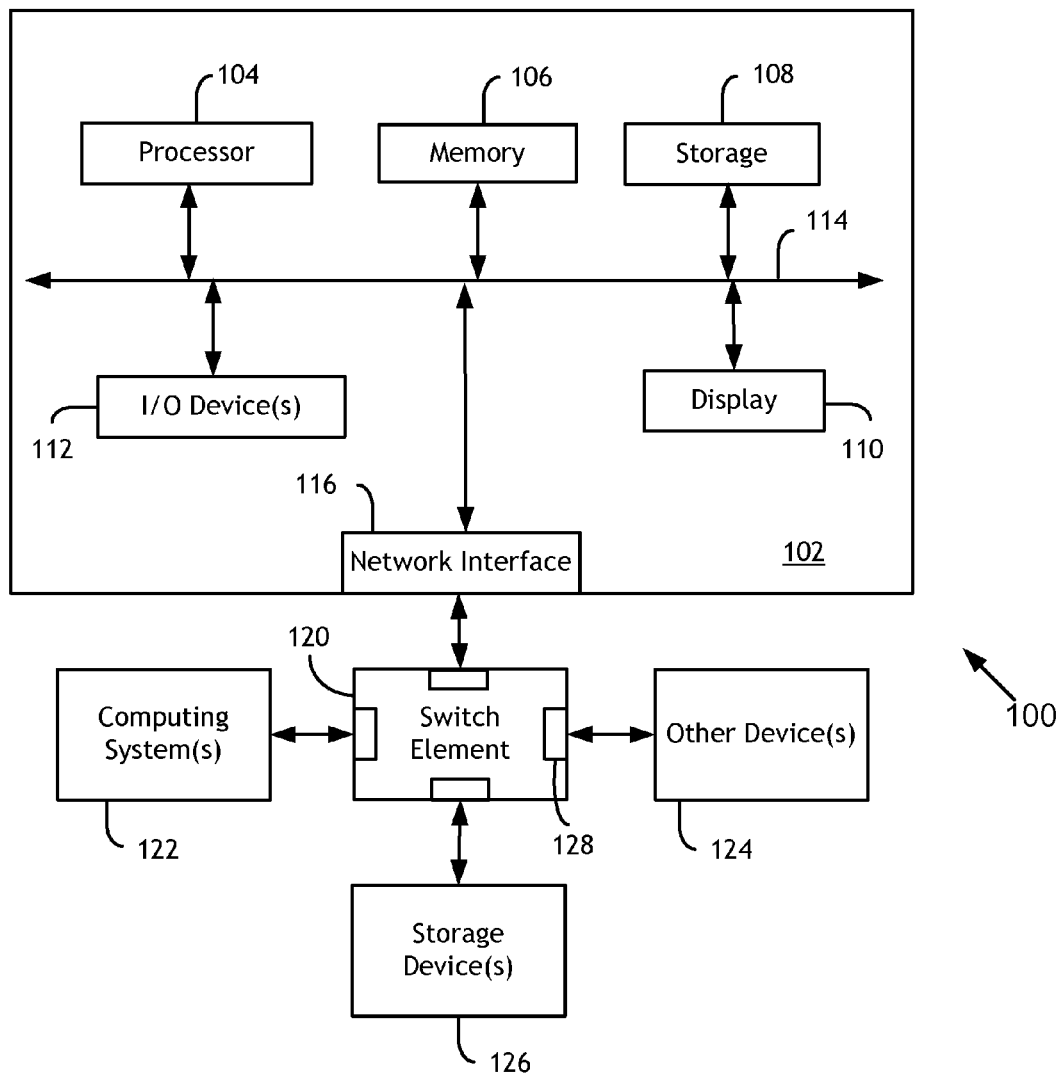

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 the host system 102 and an interface (not shown) for the storage devices 126. Fabric ports are typically located in Fabric devices, such as the switch element 120. Details regarding the switch 120 are provided below.

Figure 2A:
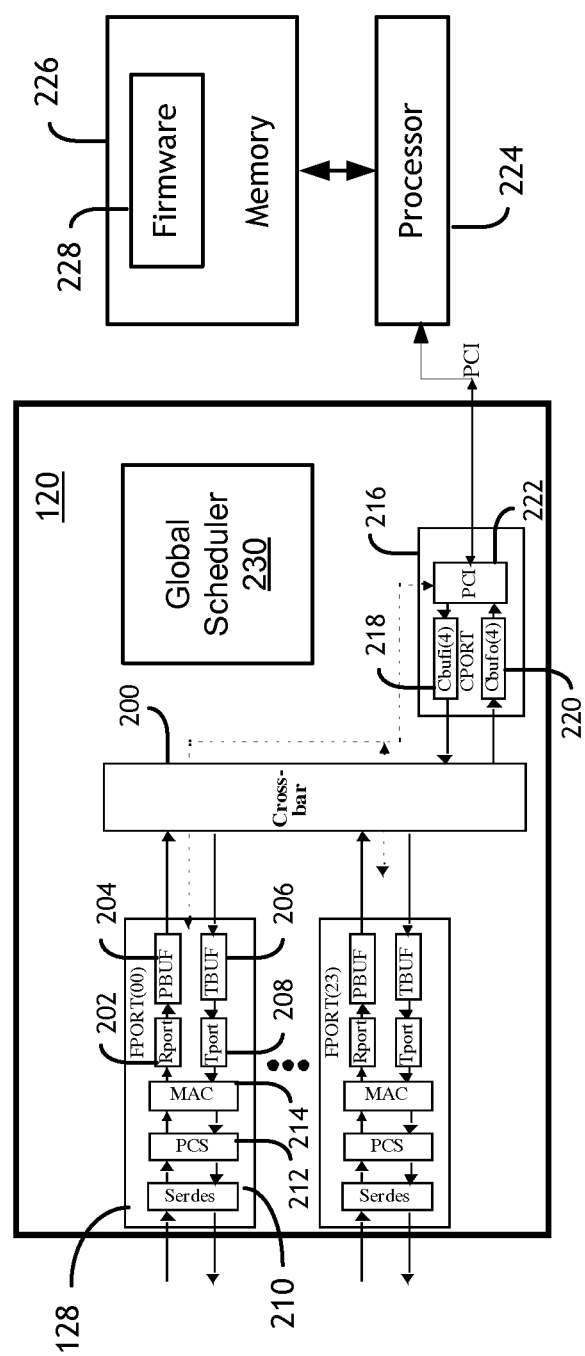
FIG. 2A is a functional block diagram of a switch element according to the present embodiments.

FIG. 2A is a high-level block diagram of switch element 120, also referred to as the switch 120. Switch element 120 may be implemented as an application specific integrated circuit (ASIC) having a plurality of ports 128. A global scheduler 230 described below in detail schedules frame processing for all ports 128, according to one embodiment.

Ports 128 are generic (GL) ports and may include an N_Port, F_Port, FL_Port, E-Port, or any other port type. The ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT (or receive segment) 202 temporarily stores received frames at a memory storage device, shown as PBUF (pause buffer) 204. The frames are then sent to a transmit segment (or transmit port (TPORT) 208 via the crossbar 200. The TPORT 208 includes a memory device shown as a transmit buffer (TBUF) 206. The TBUF 206 may be used to stage frames or information related to frames before being transmitted. The TPORT may also include a shared MAC and PCS or use the MAC and PCS of RPORT 202. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently, operating sub-ports, each uniquely identified for receiving and sending frames. The sub-port configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
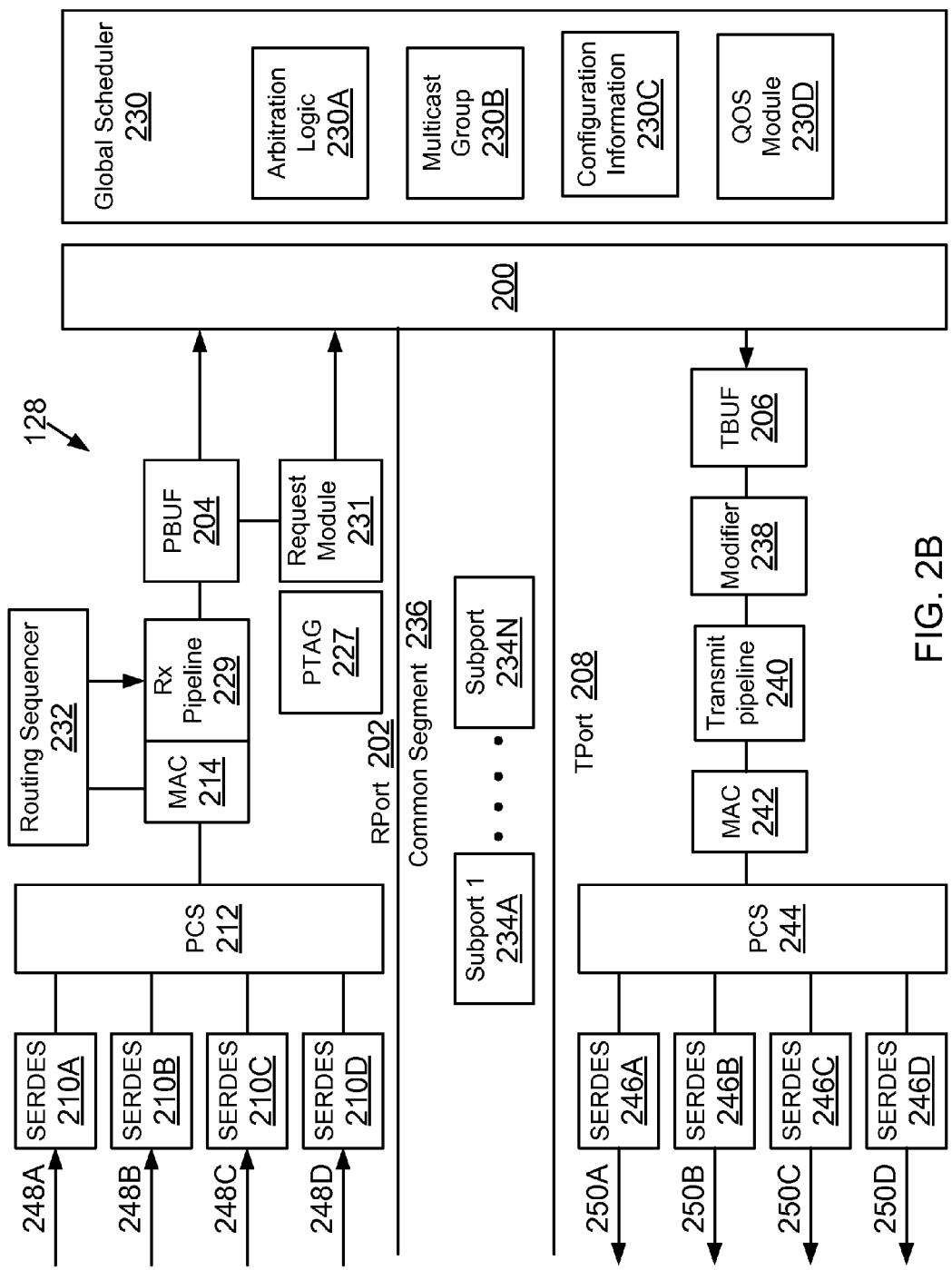
FIG. 2B shows a block diagram of a receive segment, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128.

In one embodiment, base-port 128 may be configured to include a plurality of sub-ports, each identified uniquely, to operate as an independent port. The configuration information/logic 234A-234N for each sub-port may be stored in common segment 236.

RPORT 202 may include or have access to a plurality of network links, for example, four independent physical network links (or lanes) 248A-248D, each configured to operate as a portion of an independent sub-port within base-port 128. Each network link is coupled to a SERDES 210A-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 may be a port of receive pipeline 229.

Incoming frames are received via one of the network links 248A-248N. The received frame is processed by the appropriate SERDES and then sent to the PCS 212. After PCS 212 processes the frame (for example, performs 8b to 10b coding), the frame is provided to MAC 214 that is time shared among a plurality of sub-ports. This means that for a certain time segment (for example, clock cycles), MAC 214 may be used by one of the sub-ports. After the MAC 214 processes the frame it is sent to receive pipeline 229 that is also time shared. Information regarding the frame or a copy of the frame is also provided to a routing sequencer 232 that determines the destination of the received packets.

In one embodiment, a frame whose destination is processor 224 is given the highest priority, followed by a frame that is routed by a ternary content addressable memory (TCAM) or steering registers located within a routing sequencer 232.

It is noteworthy that more than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

Information regarding the received frames may be stored at another memory device, shown as PTAG 227. The information at PTAG 227 may be referred to as tags that may have various fields. The various fields may include a transmit virtual queue number, a physical queue number, a transmit sub-port number, frame priority, an Ethernet type field, if any, a timestamp, error correction code and others. A tag is initialized when a frame is saved at a PBUF 204 queue. The tag is active as long as the frame is in the PBUF queue. When the receive queue location is empty, the tag is marked invalid. The tags are created and used by a read module and write module (not shown) that manages read/write operations to and from PBUF 204. PTAG 227 may also be used to stage requests for moving frames stored at the PBUF 204 receive queues, before the requests are sent to scheduler 230, as described below.

To move frames from the receive queues; a request module 231 generates requests for the global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 stores configuration information 230C for various ports and transmit queues and some of that information may be used to select requests. Scheduler 230 includes arbitration logic 230A that performs dual stage arbitration for processing requests from various base-ports, as described below in detail. Scheduler 230 also maintains a data structure at a memory labeled as multicast group 230B. The data structure stores information for identifying multicast groups that may receive multicast frames i.e. frames that are destined to multiple destinations. Scheduler 230 uses the information for processing requests that involve multicast frames. Scheduler 230 further includes a quality of service (QOS) module 230D that monitors QOS data, as described below. Details regarding scheduler 230 and its components are provided below.

Frames for transmission via TPORT 208 move via TBUF 206 and a modifier 238. In one embodiment, modifier 238 may be used to insert, change or remove information from an outgoing frame. The modification is based on the frame type and transmit virtual queue maintained at TPORT 208. The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. In one embodiment, links 248A-248D and 250A-250D are part of the same physical links that are used to receive and transmit information.

Figure 3:
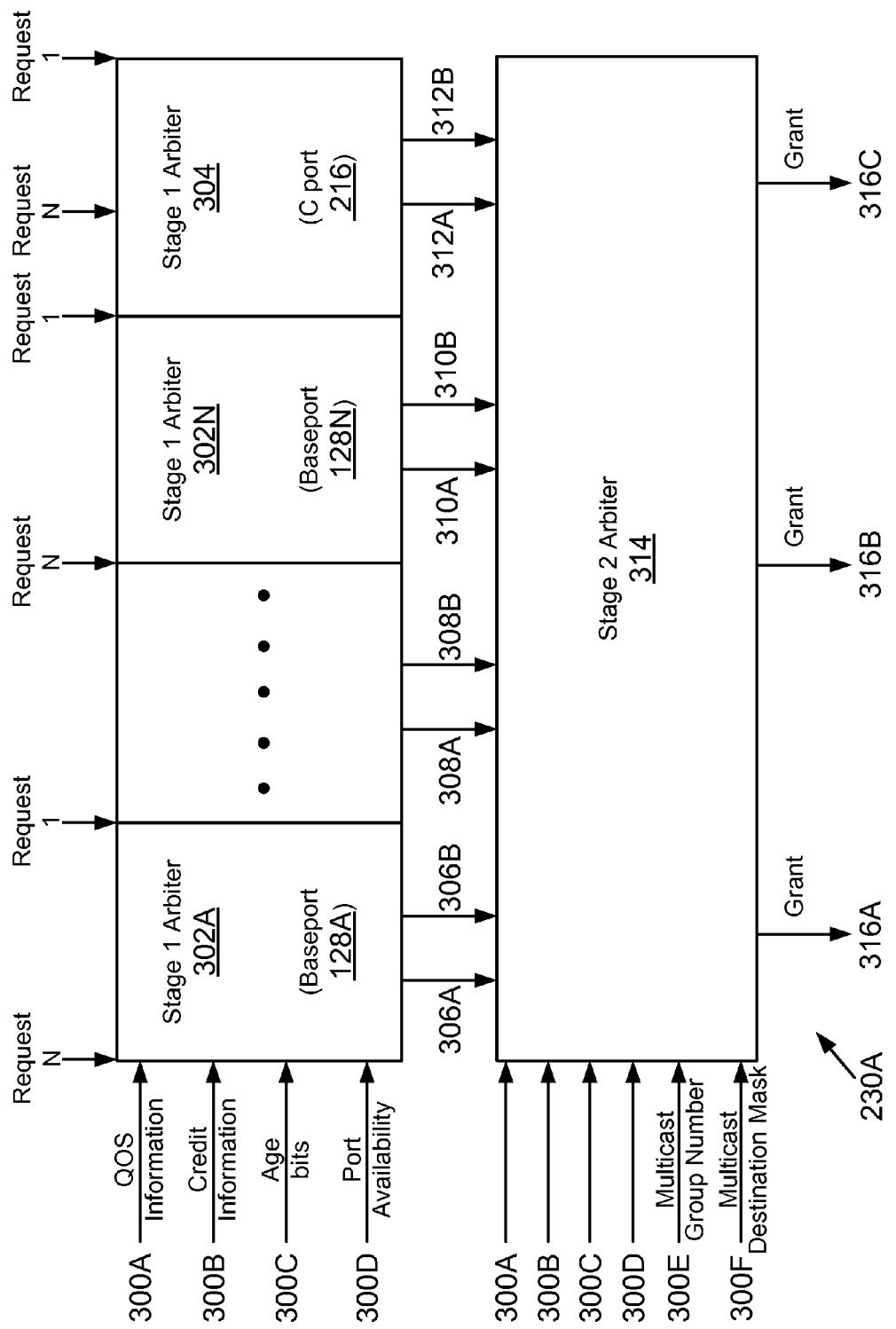
FIG. 3 shows a detailed block diagram of arbitration logic, according to one embodiment.

FIG. 3 shows a block diagram of arbitration logic 230A, according to one embodiment. Arbitration logic 230A performs dual stage arbitration for selecting requests for transmitting frames that have been received at one or more RPORTs. The first stage selects more than one request (for example, two) from each base-port. The second stage then selects a request from among the requests that are selected from the first stage. In one embodiment, there are multiple requests and grants processed simultaneously.

The first stage may include a plurality of arbitration modules ("arbiters") 302A-302N and 304. Arbiters 302A-302N receive requests (shown as request 1-request N) from each base-port shown as base-port 128A-128N. In one embodiment, each base-port may send 32 requests to each stage one arbiter. Arbiter 304 may be dedicated for processing requests that are received from CPORT 216.

Each request received by a stage one arbiter is identified by a request number and also includes the identity of the sub-port that generates the request. The request number also includes the RPORT receive queue number providing the physical location where the frame may be stored at a RPORT. The request further includes a code that identifies the type of requests, i.e. whether the request is to the CPORT, the request is for a unicast frame or a multicast frame i.e. meant for more than one destination. If the request is for a multicast group, then the request includes an identifier identifying the multicast group. Each request also includes an identifier that identifies a destination sub-port.

Each request from a base-port (or a sub-port of a base-port) includes a destination transmit virtual queue number. This is used to identify one of the virtual transmit queues maintained at the transmit port that is being requested by a particular request. The request may also include a transmit port physical queue number field that is used to identify a physical transmit queue that is maintained at the destination sub-port.

Each request also includes a tag that includes a priority code and priority information for the request. The priority information is used by the stage one arbiter to select one of the requests from among a plurality of requests. How the priority code from the request is applied depends on how the request destination transmit virtual queue is configured for processing in the scheduler. Each virtual transmit queue may be configured in the scheduler for processing as high priority, fixed priority, QOS priority or QOS rigid priority. A high priority is the highest priority level, followed by fixed priority, QOS priority and QOS rigid priority.

QOS is a method of controlling the amount of bandwidth that is allowed from various source ports to a specific destination sub-port's set of virtual transmit queues. The global scheduler 230 may be used to allocate the bandwidth to a specific destination sub-port on a percentage basis from among a plurality of groups of source traffic. The groups may be referred to as Enhanced Transmission Selection (ETS) classes.

In one embodiment, each sub-port TBUF may include a plurality of source traffic group structures called QOS-Bins. The QOS bin may be used to monitor the bandwidth consumed by its source traffic group and then adjust the QOS priory for the transmit virtual queues that are used by the source traffic groups. The QOS priority is changed dynamically as frames are transmitted. The use of QOS bins is described in detail in the patent application, entitled SYSTEMS AND METHODS FOR QUALITY OF SERVICE IN NETWORKS, U.S. application Ser. No. 13/678,135 and filed on Nov. 15, 2012.

To select a request for a base-port, arbiters 302A-302N and 304 receive real time inputs 300A-300D, according to one embodiment. Input 300A includes QOS information. The QOS information is the dynamically changing QOS Priority of the QOS bins as shown in Table I below:

TABLE I

| QOS Priority | QOS Priority Definition | Comment |
| --- | --- | --- |
| 7 | X < ¼ Min | Highest Priority |
| 6 | ¼ Min ≤ X < ½ Min | |
| 5 | ½ Min ≤ X < ¾ Min | |
| 4 | ¾ Min ≤ X < Min | |
| 3 | Min ≤ X < ½ Max | |
| 2 | ½ Max ≤ X < ¾ Max | |
| 1 | ¾ Max ≤ X < Max | |
| 0 | X ≥ Max | Lowest Priority |

Where: Min=TBUF 206 configuration QOS bin entry minimum bandwidth threshold value; Max=TBUF 206 configuration QOS bin entry maximum bandwidth threshold value; and X=TBUF 206 configuration QOS bin entry actual bandwidth consumed counter (not shown) value.

Input 300B provides credit information for each transmit physical queue of a sub-port that has sent a request to a stage one arbiter. A network link partner's receiving port, typically has limited receive buffer space to store packets. The link partner's port reports its available space to transmitting ports as "credits" i.e. available storage space to store frames or uses a pause frame exchange to indicate lack of frame storage space. If the link partner's receive buffer storage is full and it cannot take any more frames, it means it is out of credit.

When a transmit physical queue of a transmitting port has zero credit, it means that it cannot transmit any frames associated with that transmit physical queue. Input 300B is used to determine if a transfer can occur because credit is available or a port has to wait until credit is unavailable at a destination link partner port. A link partner is another device not included within switch element 128, for example, ports on devices 122, 124 and 126. Arbiter 302A-302N and 304 use the credit information to select a request as described below in detail.

Input 300C provides age information for each request. The age information is used as tie-breaker to select a request from among a plurality of pending requests that may have the same priority. The age information 300C may be provided as age bits that indicate the relative age between requests. This allows stage one arbiters to select older requests having the same priority.

Input 300D are signals from each sub-port indicating whether the sub-port is available to receive frames from the crossbar 200 into TBUF 206 for transmission. This may be indicated by a single "available" bit. In one example, a bit value of 1 may indicate that a sub-port is available. The CPORT 216 may also send a bit value to indicate whether it is available or not. A sub-port may not be available because of its configured state or if it is currently busy processing a frame.

Arbiters 302A-302N and 304 may select two request for each base-port 128. The qualified request may be selected based on the priority code and if the priority code is the same, then age bits are used to select the oldest requests from among the highest priority qualified requests. A qualified request is one with a destination sub-port that is available and a transmit physical queue that has credit. In other words, qualified requests are requests where all of the requested resources to process the request and transmit the frame are available. The requests selected from the first stage (i.e. 306A/306B, 308A/308B, 310A/310B and 312A/312B) are sent to a second stage arbiter 314 that performs a second arbitration step.

Similar to the stage one arbiters, the second stage arbiter 314 also receives inputs 300B, 300C and 300D. In addition, second stage arbiter 314 receives input 300E for a multicast group and a destination mask 300F for handling multicast requests. In one embodiment, a multicast group maps a multicast group number 300E to a destination mask 300F that may be used by arbiter 314 to determine destination ports for a frame. The multicast group information may be stored in a static random access memory 230B (labeled as multicast group, FIG. 2B) accessible to scheduler 230. The use of inputs 300E and 300F in the second stage arbitration is described below.

Second stage arbiter 314 first selects the qualified requests based on priority. If there is more than one qualified request with the same highest priority, then age is used to select the oldest request from among the high priority requests. In one embodiment, age could be replaced by round-robin to select a request when there is more than one qualified requests with the same highest priority. In one embodiment, if more than one qualified request has the same highest priority and age then a round robin mechanism may be used to select one of the qualified requests having the same age and priority. In the illustrated embodiment, if two or more requests are asserted in the same clock cycle the age bit that represents the relative age between the two different requests has its value toggled. This toggling has the effect of rotating through requests age if a timestamp mechanism was used to provide age information of requests in place of the relative age bits used in the illustrated embodiment.

After the second stage arbitration, a grant pair (for example, a PBUF grant 316A and TBUF grant 316B, a PBUF grant 316A and CBUFO grant 316C or CBUFI grant and TBUF grant 316B) is generated and sent to the appropriate sub-port(s). In one embodiment, only one grant type is sent to the same port within a clock cycle. In other words, only one PBUF grant 316A and only one TBUF grant 316B will be sent to a given port at the same time, in the same clock cycle. Multiple grant pairs may be sent to sub-ports belonging to other base-ports within the same clock cycle.

The PBUF grant 316A identifies the request and includes a grant code that may be used to indicate if the grant is a unicast grant, partial multicast grant, a completed multicast grant or is not a grant. The grant code may be a 2-bit value. The PBUF receiving the grant deactivates the request for certain clock periods. When a TBUF receives a grant it also deactivates the signal indicating that it is "available" for the sub-port that got the grant. This prevents any grants to requests that have the same destination sub-port. After a transfer, the destination sub-port becomes available again as indicated by input 300D to the first stage and second stage arbiters.

In one embodiment, the TBUF grant 316B may also include a grant code similar to the PBUF grant. The TBUF grant also identifies a destination sub-port, source base-port identifier, a transmit port virtual and physical queue number.

The CBUF grant 316C includes a source base-port number and an indicator indicating if the grant is valid or not. The arbitration process used by global scheduler 230 is now described below with respect to FIGS. 4-6.

Figure 4:
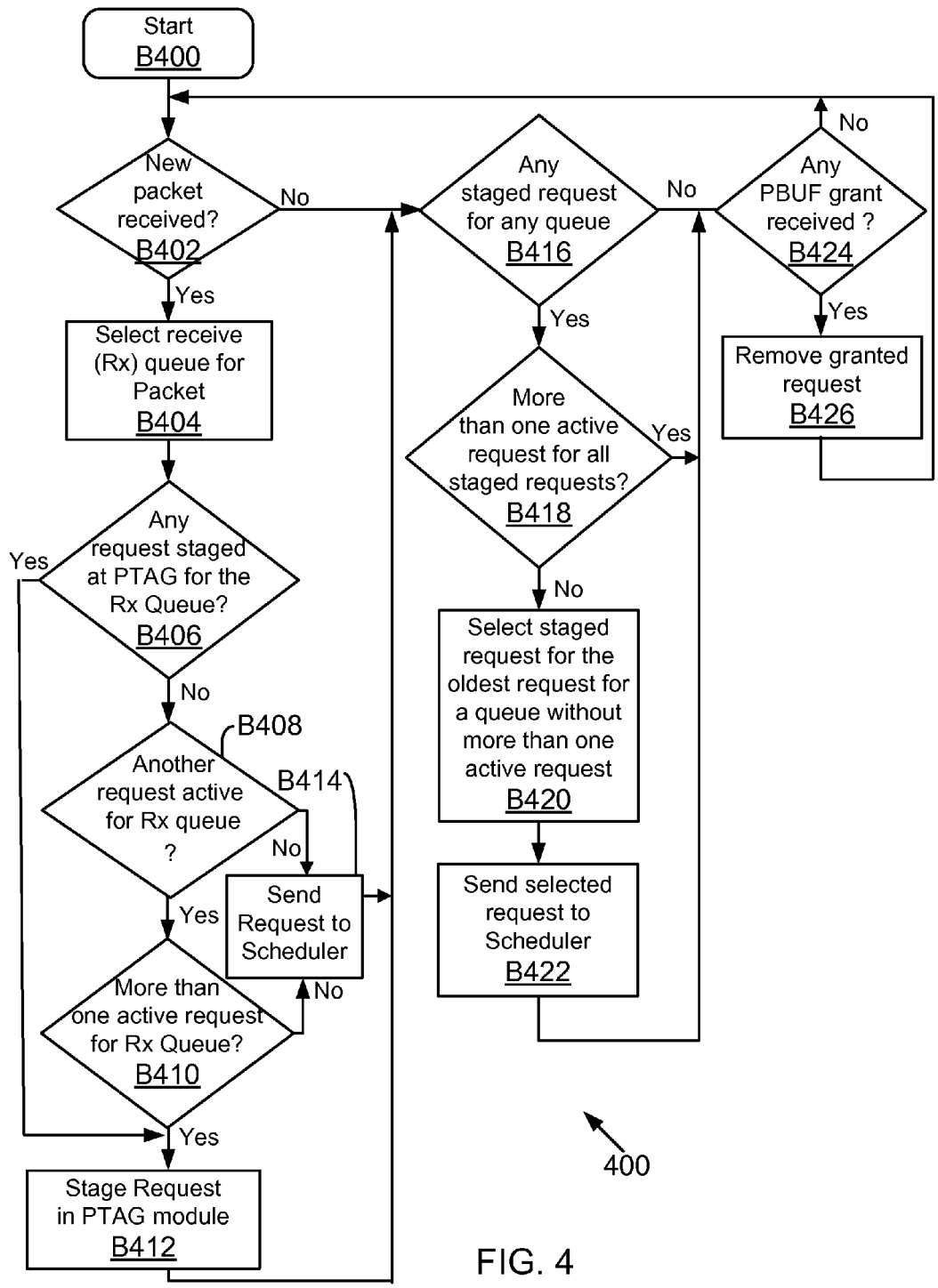
FIGS. 4-6 show process flow diagrams, according to one embodiment.

The arbitration process used by the global scheduler 230 is described below with respect to FIGS. 4-6. FIG. 4 shows a process 400, according to one embodiment. The process begins in block B400. In block B402, the process determines if a new packet has been received at a RPORT 202 of a sub-port. If a new packet has been received, then in block B404, a PBUF receive queue is selected for the new packet and the process advances to block B406.

In block B406, the request module 231 determines if any requests for the receive queue selected in block B404 are staged at PTAG 227. If there are no requests for the selected receive queue staged in PTAG 227, then the process advances to block B408.

In block B408, the request module 231, determines if another request from the same selected receive queue is active i.e. pending a grant. If there is another request active for the selected receive queue, in block B410, the request module 231 determines if more than one request is active from the same selected request queue. If more than one request is active, then the request is staged at PTAG 227. If more than one request is not active, then the request is sent to the appropriate stage one arbiter of scheduler 230 in block B414. If another request is not active, as determined in block B408, then the request is sent to the scheduler 230 in block B414. If, in block B406, there is a staged request for the selected receive queue, then in block B412, the new request gets staged at PTAG 227 behind the ones already staged for the same selected receive queue.

Referring back to block B402, if a new packet has not been received, then in block B416 the request module 231 determines if there are any staged requests in PTAG 227 for any receive queue. If it is determined that there are some staged requests in PTAG 227, then in block B418, the request module 231 determines if more than one request is active from the list of the receive queue. If more than one request is active for all of the staged requests, then the process advances to block B424. In block B424, the request module 231 determines if a grant has been received from scheduler 230. If a PBUF grant is received, then it is removed from the appropriate receive queue in block B426 and the process moves back to block B402. If no PBUF grant is received, then the process moves back to block B402.

Referring back to block B418, if there are staged requests for receive queues that do not have more than one request pending, then in block B420 the oldest staged request is selected and the process advances to block B422. In block B422, the oldest staged request is sent to the scheduler 230 by the request module 231. The process then advances to block B424.

Figure 5A:
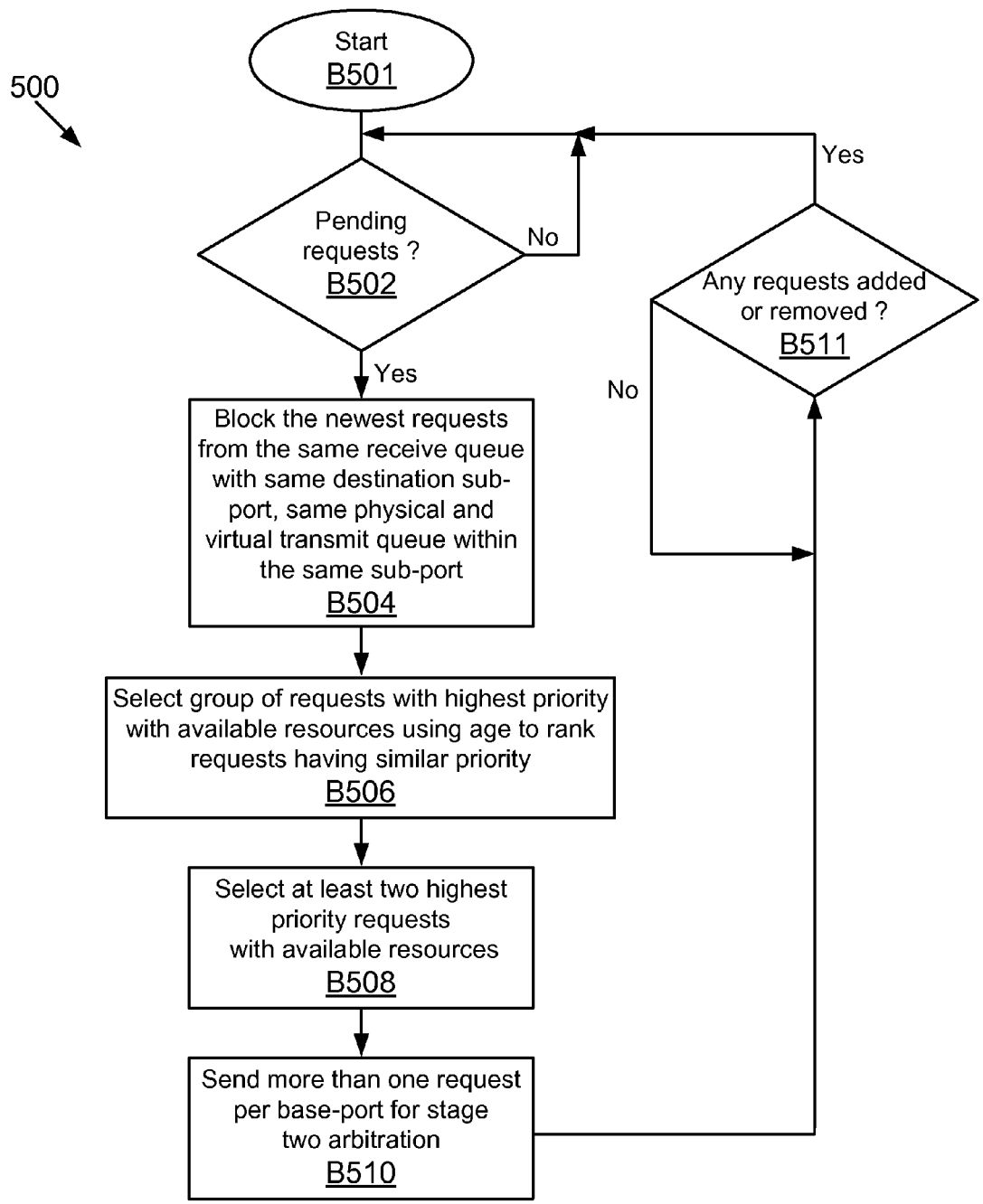

FIG. 5A illustrates a process 500 for arbitrating between a plurality of stage one requests, according to one embodiment. The process begins in block B501. In block B502, the arbiter for a base-port (for example, 302A) determines if there are any pending requests. If yes, then in block B504, any requests from the same receive queue and destined for the same sub-port and same physical transmit queue and the same virtual transmit queue are blocked. In block B506, a group of requests with the highest priority and available resources e.g. credit, available destination sub-port etc., are selected. The priority is determined from the priority code in a request tag and the transmit virtual queue configuration, while resource information may be obtained from inputs 300A-300D that are described above.

In block B508, at least two of the highest priority requests are selected. If there are requests with the same priority, then the oldest of the requests having the same priority are selected. In block B510, the selected requests are sent to the stage two arbiter 314. In block B511, the arbiter determines if any new requests have been made or if any previously pending requests have been removed. If yes, then the process goes back to block B502. If no, the process stays at block B511 waiting for a change.

Figure 5B:
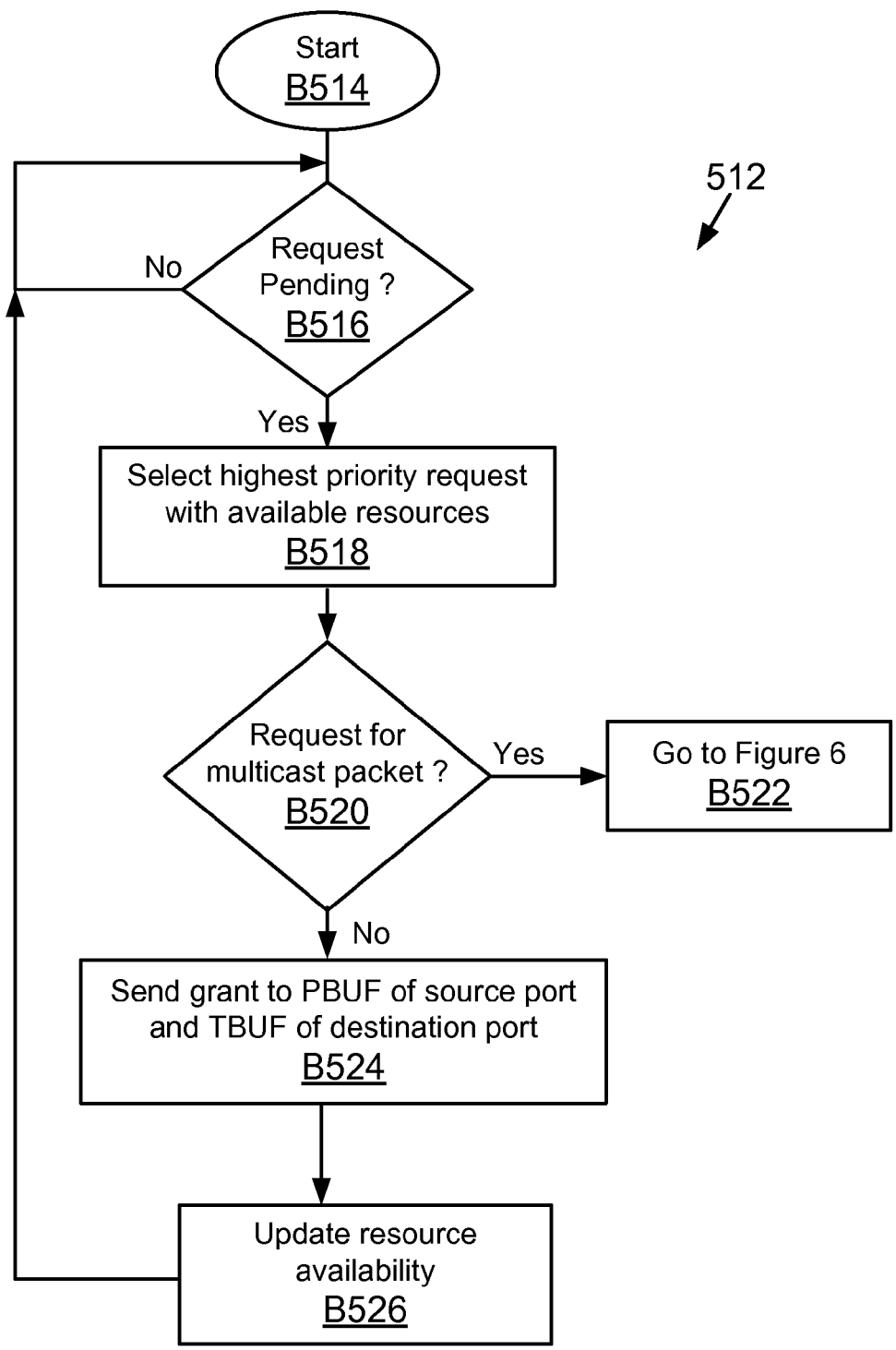

FIG. 5B illustrates a process 512 for selecting requests in stage two, according to one embodiment. The process starts in block B514. In block B516, the stage two arbiter 314 determines if there are any pending requests. If there are no pending requests, then the arbiter simply waits. If there are pending requests, then in block B518 the request with the highest priority is selected. The priority of a request may be determined from the priority code of each request tag and the transmit virtual queue configuration. Once again, if there are requests that have the same priority, then the oldest request from among the requests with the same priority is selected.

In block B520, arbiter 314 determines if the packet for the selected request is a multicast packet. If yes, then the process moves to FIG. 6 in block B522. If the request is not for a multicast packet, then a grant is sent to the PBUF of the source sub-port and the TBUF of the destination sub-port. Thereafter, in block B526, the resources used to process the grants become "unavailable."

Figure 6:
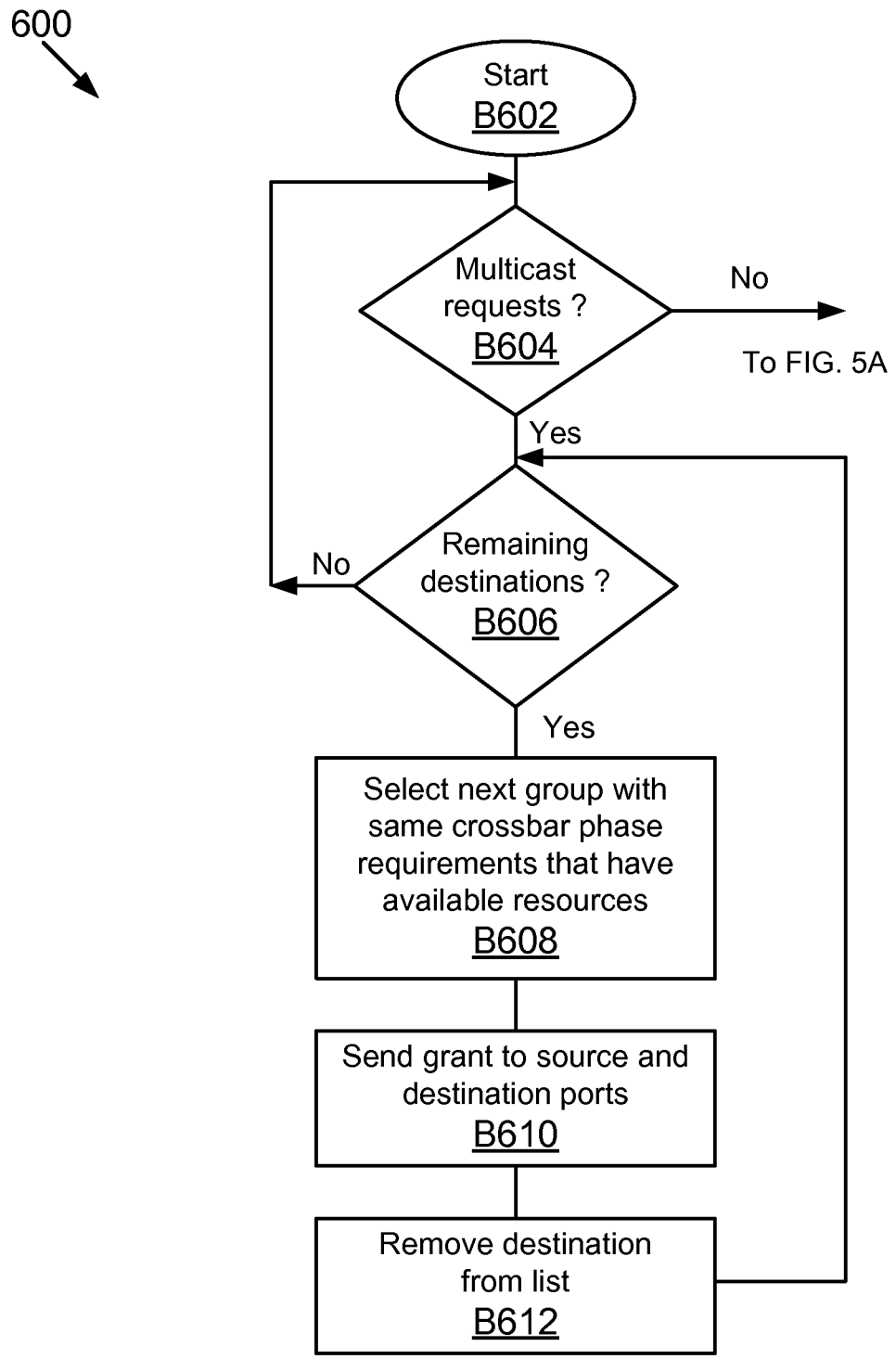

FIG. 6 illustrates a process 600 for handling multicast packets, according to one embodiment. The process begins in block B602. In block B604, stage two arbiter 314 determines if there are any multicast requests. If there are no multicast requests, then the process simply loops back to FIG. 5A.

If there are requests, then in block B606, arbiter 314 determines if there are any remaining destinations to send the multicast frames. If there are no remaining destinations, then the process loops back to block B604.

If there are remaining destinations in block B606, then in block B608 the destination mask is determined by reading the multicast group memory location specified in the multicast group number field. Arbiter 314 selects the next group of destinations that share the same crossbar phase requirements and have available resources. Arbiter 314 is aware of the phase requirements corresponding to sub-ports based on configuration information 230C. The crossbar 200 is time multiplexed where each sub-port of a base-port is allocated a time window. Thus, each TBUF of a base-port has four phase windows to transmit frames. The manner in which the phase windows are used depends on how a port is configured. For example, if all the sub-ports are configured to operate as single lanes, then each gets an equal phase window to access crossbar 200. If two sub-ports are configured as single lane and the other two are configured to operate as a single dual lane sub-port, then the dual lane sub-port gets half of the total time window, while each of the single lane ports get a quarter of the total time window.

Thereafter, in block B610, a grant is sent to the source and destination sub-ports. The destinations that receive the multicast frame are removed from the pending destinations list in block B612.

Figures 1, 7A:
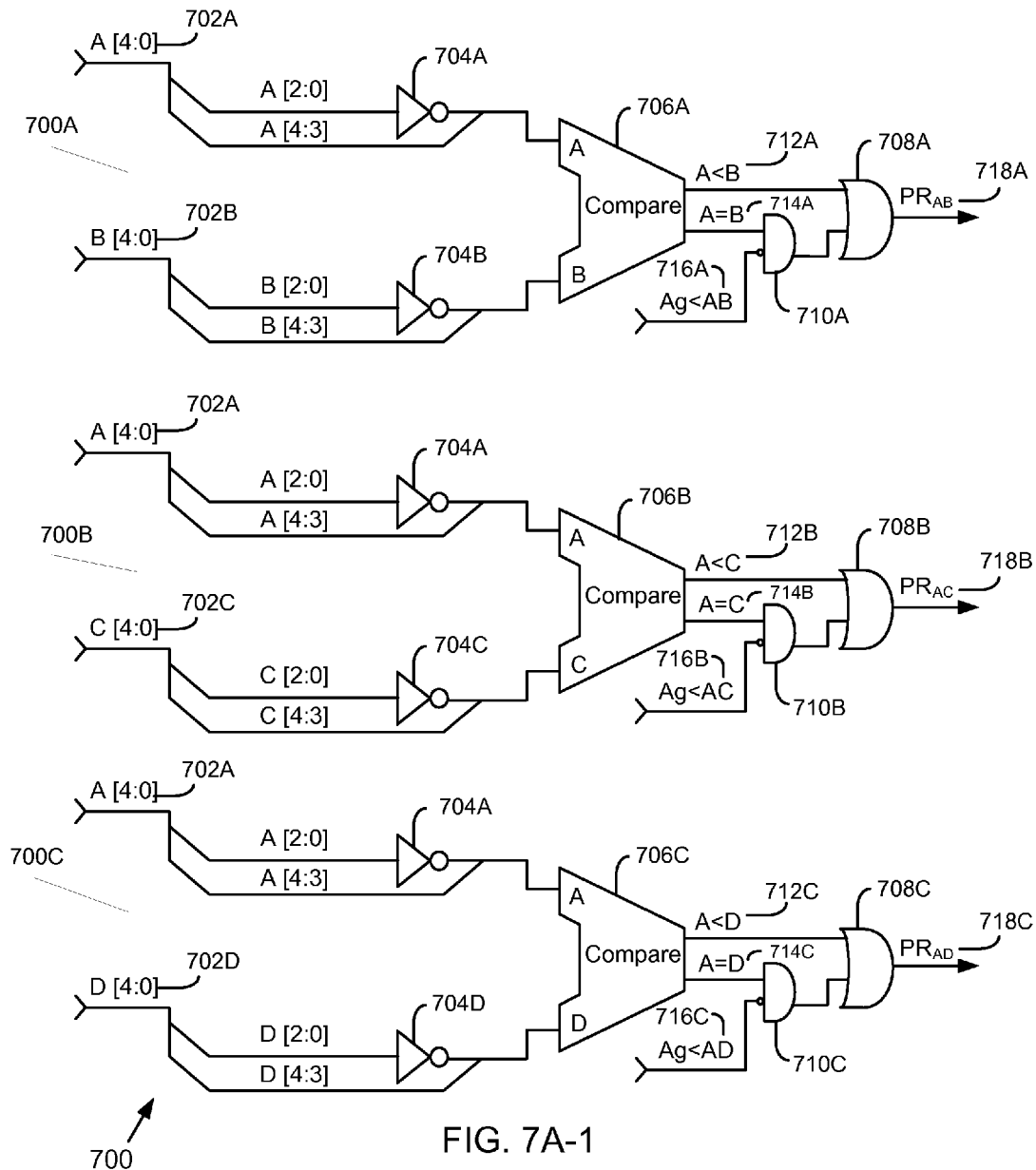
Figures 2, 7A:
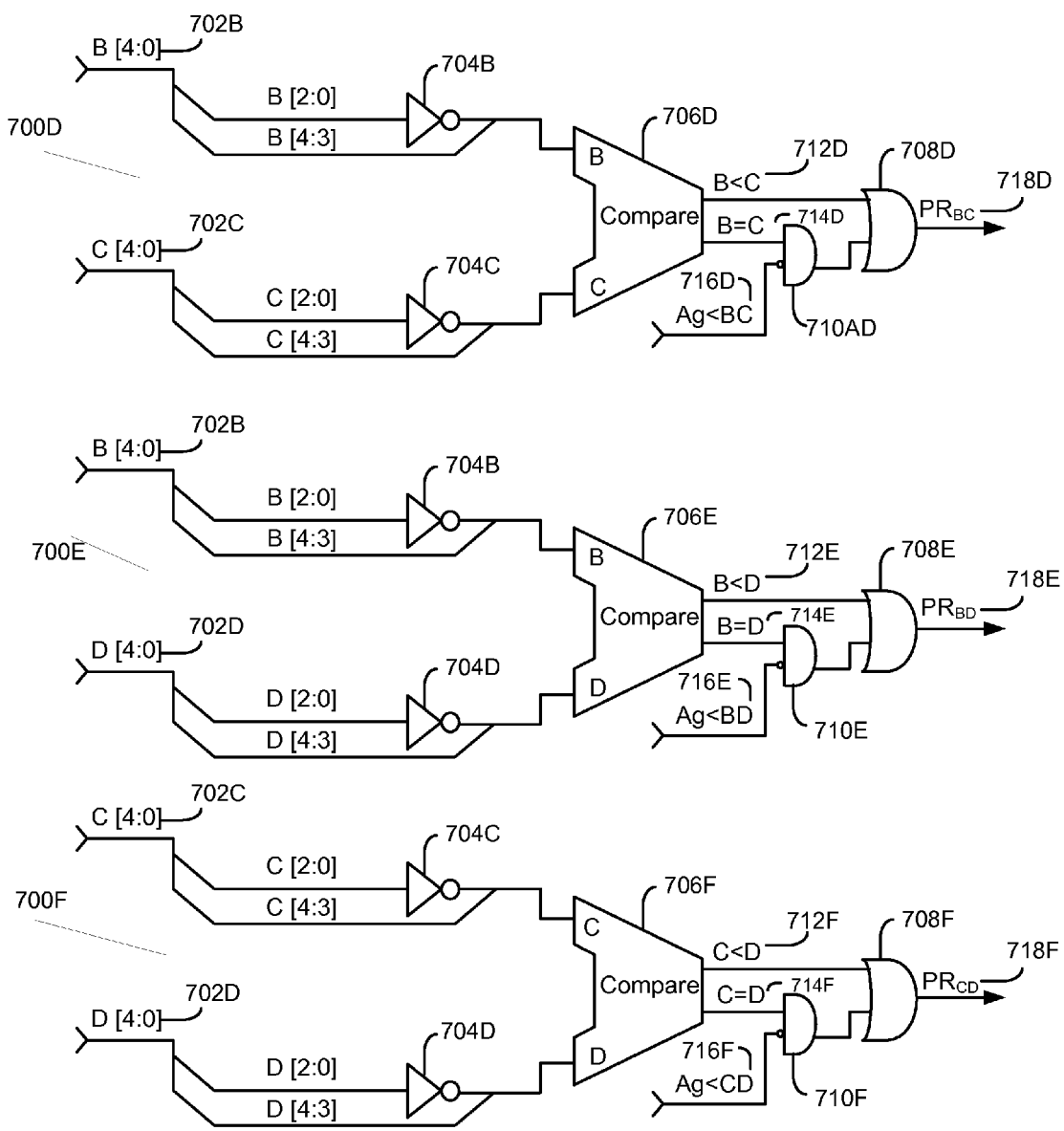
FIG. 7A (shown as FIG. 7A-1 and FIG. 7A-2 and referred to jointly as FIG. 7A)

FIGS. 7A-7D show various circuits that may be used to implement the process flow of FIGS. 4-6, according to one embodiment. FIGS. 7A(i)-7A(ii) (jointly referred to herein as 7A) show an example of a circuit 700 used to resolve priority of incoming requests from a plurality of sub-ports, according to one embodiment. In one embodiment, priority information for four requests, A, B, C and D are compared against each other. The priority information may be any number of bits, for example, 5 bits in size. Circuit 700 may be used to process N requests, although only four are shown in FIG. 7A. Circuit 700 may have a plurality of segments 700A-700F to compare priorities of requests A-D, i.e. A vs. B, A vs. C, A vs. D, B vs. C, B vs. D and C vs. D. The various segments include inverter logic 704A-704D, a plurality of compare modules 706A, gates 710A-710F and 708A-708F.

In segment 700A, the priority of request A and B are compared. Portion of priority data for requests A and B are inverted by inverters 704A and 704B. The inverted information may be the QOS information for the requests. It is noteworthy that the embodiments disclosed herein are not limited to inverting the priority data.

Compare module 706A compares the priority of requests A and B. If A is less than B, which in this embodiment means that the priority of A is greater than B, then signal 712A has a certain value. As an example, signal 712A may have value of 1, indicating A has higher priority or a value of 0 indicating that B has a higher priority.

If A is equal to B, then signal 714A has a certain value that is fed to gate 710A. In one embodiment, signal 714A has a value of "1" if input "A" is equal to input "B" and a value of "0" if they are not equal. When output 714A has a value of "1" then the relative age 716A between the requests is used to select between the two requests A and B. If request "A" was asserted before request "B" then the relative age bit 716A will have a value of "0". If request "B" was asserted before request "A" then the relative age bit 716A will have a value of "1".

Signal 712A and the output from gate 710A is sent to gate 708A. A final output 718A is then generated from gate 708A indicating which request is given higher priority. For example, if 718A has a value of "1" then request "A" is selected over request "B". If 718A has a value of "0" then request "B" is selected over request "A".

Segment 700B compares the priority of requests A and C. Segment 700C compares priority of requests A and D. Segment 700D compares priority of requests B and C, while segment 700E compares the priority of requests B and D. Segment 700F compares priority of requests C and D.

The logic of segment 700A is similar to the logic of segments 700B-700F. For example, priority information 702C and 702D for requests C-D are similar to 702A and 702B, respectively. Inverter logic 704B-704D is similar to logic 704A. Compare modules 706B-706F are similar to compare module 706A. Signals 712B-712F are similar to signal 712A, signals 714B-714F are similar to signal 714A, and signals 716B-716F are similar to signal 716A. Logic 710B-71F and logic 708B-708F are similar to logic 710A and 708A, respectively. The output signals 718B-718F are similar to output signal 718A. For brevity's sake, the description of various segments 700B-700F is not being repeated because the functionality of these segments is similar to 700A, except different request priorities are compared.

Figure 7B:
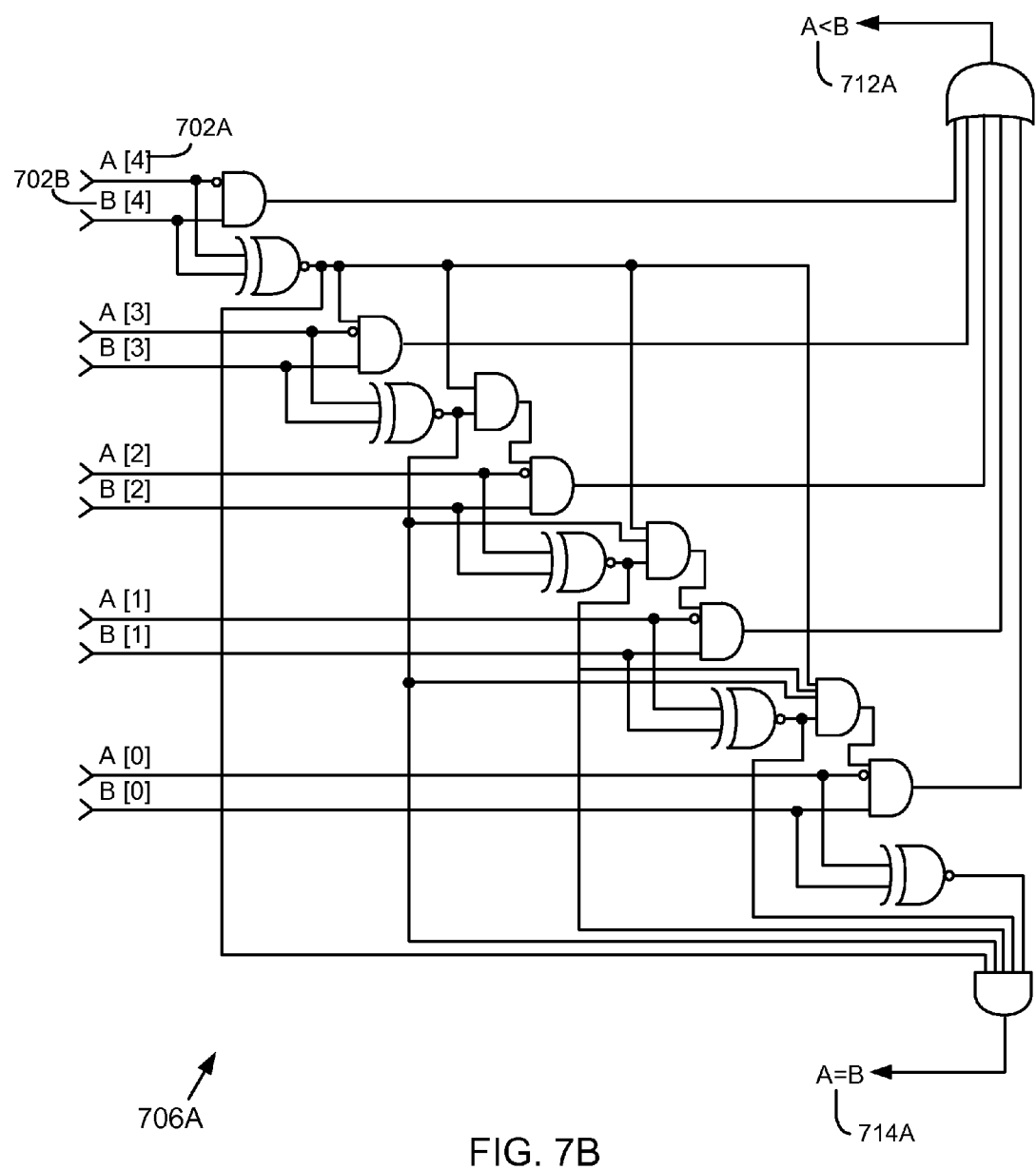
FIGS. 7B-7D show examples of circuits for implement-ing the process flow diagrams of FIGS. 4-6.

FIG. 7B shows an example of the comparator 706A used in circuit 700 described above with respect to FIG. 7A. In this example priority of request A 702A and request B 702B are inputs to comparator 706A for generating outputs are 712A and 714B. Circuits for other comparators 707B-706F are similar to 706A.

Figure 7C:
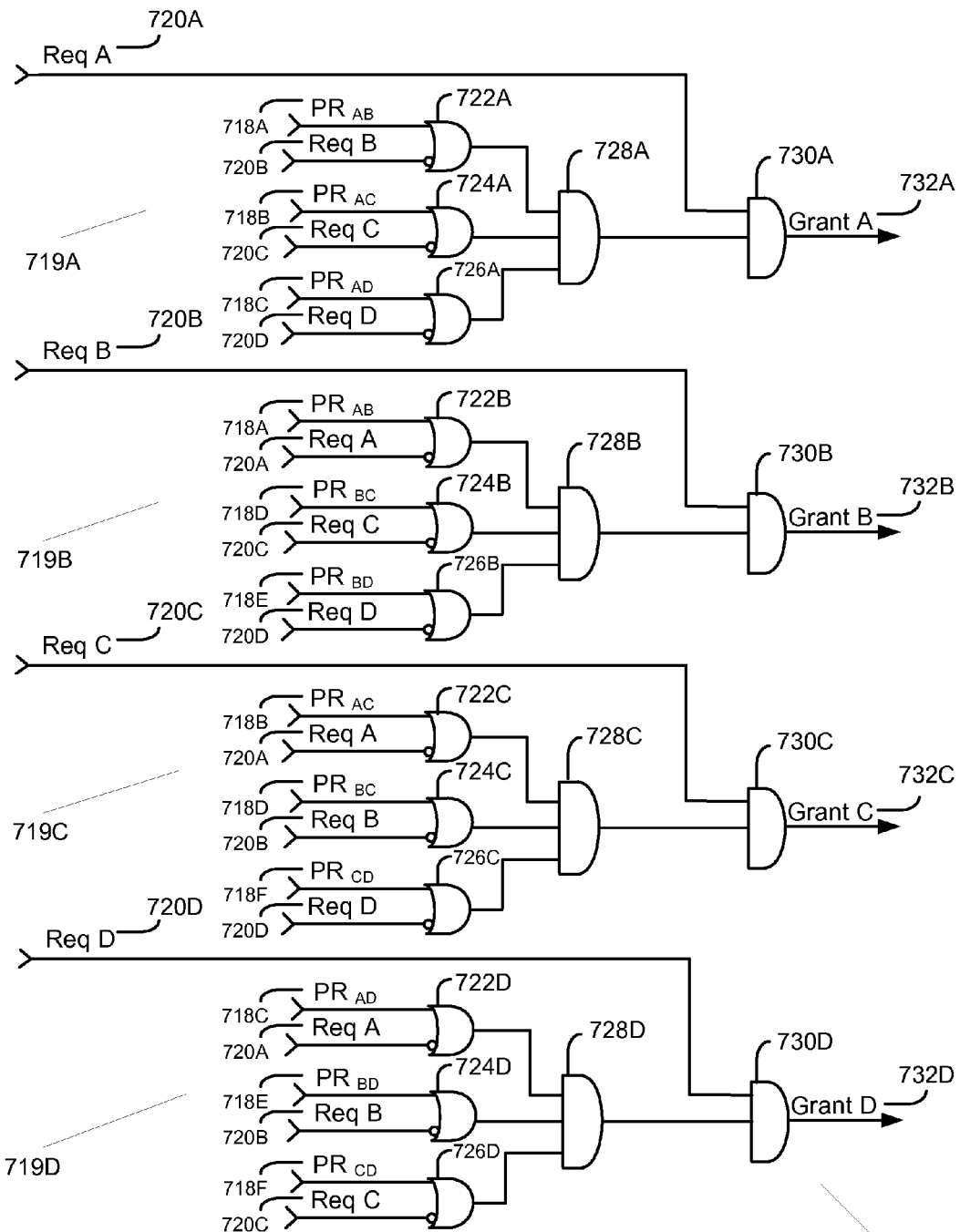

FIG. 7C shows an example of an arbitration circuit 719 with segments 719A-719D for arbitrating between requests A-D to generate the first grant 306A in the first stage, described above with respect to FIG. 3. To receive a grant, a request has to beat other requests. The request can beat other requests by a higher request priority with the age-bits breaking any ties or if the other request is not asserted at a given time.

Segment 719A shows how request A (720A) can win arbitration. Segment 719B Segment 719A shows how request B (720B) can win arbitration. Segment 719C shows how request C (720C) can win arbitration. Segment 719D shows how request D (720A) can win arbitration.

Gates 722A, 724A and 726A in segment 719A perform an "OR" operation. Each gate receives 718A, 718B and 718C signals. If request B 720B is not asserted, then it is inverted by gate 722A. If request C 720C is not asserted, then it is inverted by gate 724A and if request D 720B is not asserted, then it is inverted by gate 726A. If the value the output of all three "OR" gates (i.e. 722A, 724A and 726A) is "1" as provided to gate 728A and the request is active as indicated by the input to gate 730A, then request A will receive the grant, as indicated by 732A.

The logic in segments 719B-719D is similar to the logic in segment 719A. For example, gates 722B-722D are similar to gate 722A, gates 724B-724D are similar to gate 724A; gates 726B-726D are similar to gate 726A; gates 728B-728D are similar to gate 728A and gates 730B-730D are similar to gate 730A. Grants to request B, C and D indicated by 732B-732D, respectively, are also similar to grant to request A indicated by 732A.

It is noteworthy that the arbiter circuit 719 may be used in both the stage 1 arbiter 302A and the stage 2 arbiter 314, described above in detail.

Figure 7D:
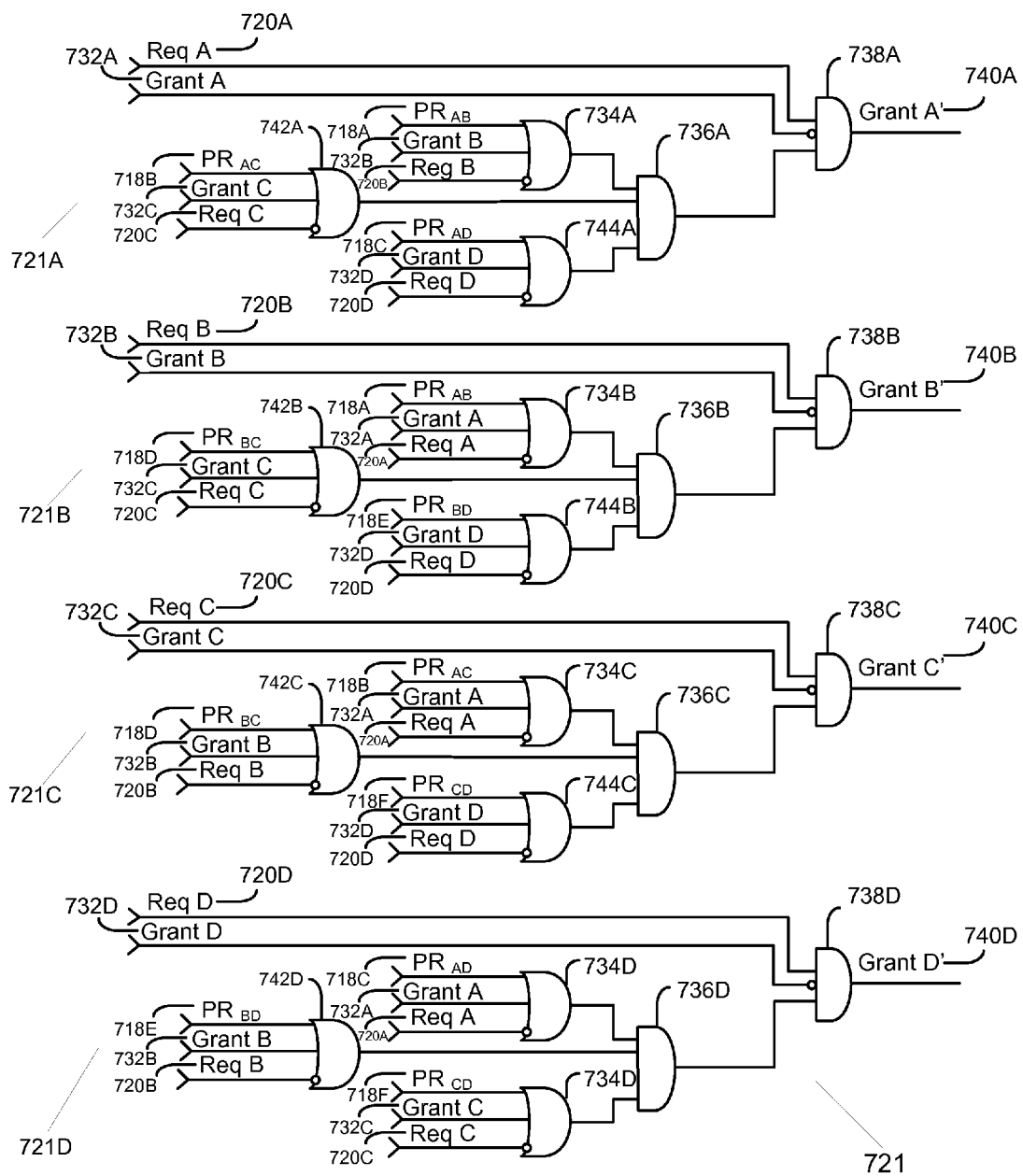

FIG. 7D shows an example of the arbiter circuit 721 with segments 721A-721D that may be used in stage one arbiters 302A to generate the second grant output 306B. This circuit is very similar to the circuit in FIG. 7C except if a request is granted by the circuit in FIG. 7C it is blocked for getting a grant in this circuit so the same request does not generate two grants for the stage 1 arbiters 302A-302N. For example, in segment 721A, if request A 720A was granted by the circuit 719 of FIG. 7C, then the request is inverted at gate 738A to prevent request A 720A to be granted again.

Segment 721A is similar to segment 719A; segment 721B is similar to segment 719B; segment 721C is similar to segment 719C and segment 721D is similar to segment 719D described above with respect to FIG. 7C. Gates 734A-734D are similar to gates 722A-722D; gates 742A-742D are similar to gates 724A-724D; gates 744A-744D are similar to gates 726A-726D; gates 736A-736D are similar to gates 728A-728D and gates 738A-738D are similar to gates 730A-730D described above with respect to FIG. 7C.

For brevity sake, only segment 721A is described. Request 720A and grant A 732A (from FIG. 7C) are provided to gate 738A. If request A 720A won arbitration in FIG. 7C, then grant A 732A in segment 721A is inverted and Grant A' 740A has a value of zero, indicating that request A 720A has not won arbitration in FIG. 7D.

Gate 734A receives the priority signal between request A and B 718A, request B 720B and grant for request B 732B. Gate 742A receives 718B, 732C and 720C. Gate 744A receives 718C, 732D and request D 720D. Gates 742A, 734A and 744A perform an OR operation and their outputs are provided to gate 736A. The output from gate 736A is sent to gate 738A. Grant A' is the winning request when it beats the other requests based on priority (or age if there is a tie) and if it did not win from circuit 719 of FIG. 7C.

The embodiments disclosed herein have various advantages. A scheduler that receives inputs regarding the plurality of sub-ports is used to select requests for moving frames for the plurality of sub-ports. An efficient arbitration scheme is used, regardless of operating protocols for moving frames from the sub-ports.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters and other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method for arbitration in a network device having a plurality of base-ports each with a plurality of sub-ports for sending and receiving packets, each sub-port configured to operate as an independent port for sending and receiving packets complying with a plurality of protocols, the method comprising:

determining by a stage one arbiter of a base-port if there is any pending request from a plurality of sub-ports of the base-port; wherein each of the plurality of sub-ports of the base-port sends a request to the stage one arbiter for transmitting a received packet to its destination and each request is uniquely identified, identifies a sub-port that sends the request to the stage one arbiter, identifies a transmit queue from among a plurality of transmit queues for transmitting the received packet to its destination, includes a code identifying a frame type and a priority code indicating request priority;

receiving quality of service (QOS) information at the stage one arbiter for each of the plurality of transmit queues, credit information for each of the plurality of transmit queues indicating available credit for each of the plurality of transmit queues to transmit packets; age information for each request at the stage one arbiter indicating how long a request has been pending; and information regarding whether a sub-port is available for transmitting the received packet;

blocking any other request from a same receive queue of a sub-port for transmission for a same sub-port, and a same transmit queue, when there are other pending requests;

selecting requests with highest priority, oldest age based on age information with available credit and port availability;

sending the selected requests to a stage two arbiter that receives selected requests from the plurality of base-ports;

receiving information regarding multicast groups for multicast received packets at the stage two arbiter in addition to the information that is received at the stage one arbiter;

selecting one of the requests that are received from the stage one arbiter by the stage two arbiter based on highest priority and then age of the requests; and processing the selected request for transmitting a packet associated with the selected request.

2. The method of claim 1, wherein for the selected request, one grant type is sent from the stage two arbiter to a same sub-port of a base-port within one clock cycle.

3. The method of claim 2, wherein the grant type indicates that the grant is for a unicast transmission or a multicast transmission.

4. The method of claim 2, wherein after the sub-port receives the grant, the sub-port deactivates an availability indicator indicating that the sub-port is available for transmitting packets.

5. The method of claim 1, further comprising: using a round robin selection scheme by the second stage arbiter when requests have a same priority and age.

6. The method of claim 1, wherein one of the plurality of sub-ports is configured to operate as a Fibre Channel port.

7. The method of claim 1, wherein one of the plurality of sub-ports is configured to operate as an Ethernet or Fibre Channel over Ethernet port.

8. A network device, comprising:
a plurality of base-ports each with a plurality of sub-ports for sending and receiving packets, each sub-port configured to operate as an independent port for sending and receiving packets complying with a plurality of protocols;
wherein a stage one arbiter of a base-port determines if there is any pending request from a plurality of sub-ports of the base-port, where each of the plurality of sub-ports of the base-port sends a request to the stage one arbiter for transmitting a received packet to its destination and each request is uniquely identified, identifies a sub-port that sends the request to the stage one arbiter, identifies a transmit queue from among a plurality of transmit queues for transmitting the received packet to its destination, includes a code identifying a frame type and a priority code indicating request priority;
wherein the stage one arbiter receives quality of service (QOS) information for each of the plurality of transmit queues, credit information for each of the plurality of transmit queues indicating available credit for each of the plurality of transmit queues to transmit packets; age information indicating how long a request has been pending; and information regarding whether a sub-port is available for transmitting the received packet; blocks any other request from a same receive queue of a sub-port for transmission for a same sub-port, and a same transmit queue, when there are other pending requests; selects requests with highest priority, oldest age based on age information with available credit and port availability; and sends the selected requests to a stage two arbiter that receives selected requests from the plurality of base-ports; and
wherein the stage two arbiter receives information regarding multicast groups for multicast received packets at the stage two arbiter in addition to the information that is received at the stage one arbiter; selects one of the requests that are received from the stage one arbiter by the stage two arbiter based on highest priority and then age of the requests; and processes the selected request for transmitting a packet associated with the selected request.

9. The network device of claim 8, wherein for the selected request, one grant type is sent from the stage two arbiter to a same sub-port of a base-port within one clock cycle.

10. The network device of claim 9, wherein the grant type indicates that the grant is for a unicast transmission or a multicast transmission.

11. The network device of claim 9, wherein after the sub-port receives the grant, the sub-port deactivates an availability indicator indicating that the sub-port is available for transmitting packets.

12. The network device of claim 8, wherein the stage two arbiter uses a round robin selection scheme by the second stage arbiter when requests have a same priority and age.

13. The network device of claim 8, wherein one of the plurality of sub-ports is configured to operate as a Fibre Channel port and one of the plurality of sub-ports is configured to operate as an Ethernet or Fibre Channel over Ethernet port.

14. The network device of claim 8, wherein the network is configured to operate as a switch.

15. A non-transitory, machine readable storage medium having stored thereon instructions for performing a method for arbitration in a network device having a plurality of base-ports each with a plurality of sub-ports for sending and receiving packets, each sub-port configured to operate as an independent port for sending and receiving packets complying with a plurality of protocols, comprising machine executable code which when executed by at least one machine, causes the machine to:
determine by a stage one arbiter of a base-port if there is any pending request from a plurality of sub-ports of the base-port; wherein each of the plurality of sub-ports of the base-port sends a request to the stage one arbiter for transmitting a received packet to its destination and each request is uniquely identified, identifies a sub-port that sends the request to the stage one arbiter, identifies a transmit queue from among a plurality of transmit queues for transmitting the received packet to its destination, includes a code identifying a frame type and a priority code indicating request priority;
receive quality of service (QOS) information at the stage one arbiter for each of the plurality of transmit queues, credit information for each of the plurality of transmit queues indicating available credit for each of the plurality of transmit queues to transmit packets; age information for each request at the stage one arbiter indicating how long a request has been pending; and information regarding whether a sub-port is available for transmitting the received packet;
block any other request from a same receive queue of a sub-port for transmission for a same sub-port, and a same transmit queue, when there are other pending requests;
select requests with highest priority, oldest age based on age information with available credit and port availability;
send the selected requests to a stage two arbiter that receives selected requests from the plurality of base-ports;
receive information regarding multicast groups for multicast received packets at the stage two arbiter in addition to the information that is received at the stage one arbiter;
select one of the requests that are received from the stage one arbiter by the stage two arbiter based on highest priority and then age of the requests; and
process the selected request for transmitting a packet associated with the selected request.

16. The storage medium of claim 15, wherein for the selected request, one grant type is sent from the stage two arbiter to a same sub-port of a base-port within one clock cycle.

17. The storage medium of claim 16, wherein the grant type indicates that the grant is for a unicast transmission or a multicast transmission.

18. The storage medium of claim 16, wherein after the sub-port receives the grant, the sub-port deactivates an availability indicator indicating that the sub-port is available for transmitting packets.

19. The storage medium of claim 15, wherein the machine executable code is further configured to use a round robin selection scheme by the second stage arbiter when requests have a same priority and age.

20. The storage medium of claim 1, wherein one of the plurality of sub-ports is configured to operate as a Fibre Channel port and another of the plurality of sub-ports is configured to operate as an Ethernet or Fibre Channel over Ethernet port.

* * * * *